Oct. 7, 1930.  E. E. WELLER  1,777,594
FISH LURE
Filed Aug. 11, 1927
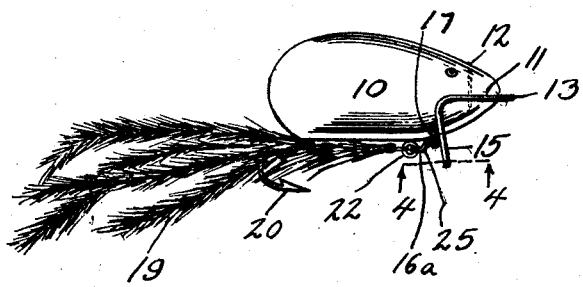
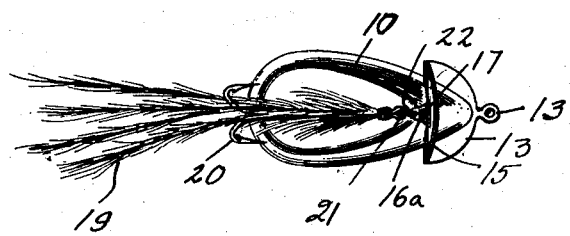
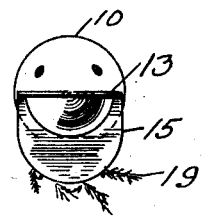
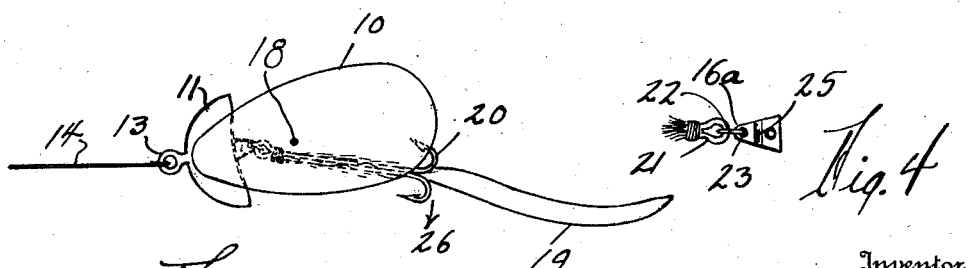
Inventor
Erwin E. Weller
By Lynn A. Latta
Attorney Patented Oct. 7, 1930

1,777,594

UNITED STATES PATENT OFFICE

ERWIN E. WELLER, OF SIOUX CITY, IOWA

FISH LURE

Application filed August 11, 1927. Serial No. 212,292.

My invention relates to fish lures of the wooden plug type, having an oscillating motion in the water, and it is my purpose to provide a bait, simulating the action of a mouse. I find that it is desirable to give to the wooden plug, which is shaped to represent the body of a mouse, an oscillating movement by means of a mouthpiece, such as that shown in my issued Patent #1,607,107 but it has also been my object to provide a tail for the mouse which would have a life-like swaying or switching movement.

The object of the present invention is therefore to provide a fish lure comprising a representation of a mouse and having a tail adapted to switch or weave from side to side in a most life-like manner as the mouse is moved through the water.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a side elevation of a fish lure embodying my invention.

Fig. 2 is an inverted plan view of the same.

Fig. 3 is a front elevation of the same.

Fig. 4 is an enlarged, detail, sectional view, taken on the line 4—4 of Fig. 1 and Fig. 5.

Fig. 5 is a diagrammatical view in plan of the mouse as it appears when moving through the water.

I have used the reference character 10 to indicate generally a wooden plug which is shaped to resemble the body of a mouse when in its most usual position, namely, with the head drawn back against the shoulders and the hind legs drawn up beneath the body. A mouth-piece 11, of the type shown in my issued Patent #1,607,107, is attached to the plug 10 by inserting in a slot and securing by a pin 12, as described in said patent. The mouth-piece has the ring 13, to which is secured the leader 14 of a fish line, (Fig. 5).

On the vertical plate 15 of the mouth-piece is the rearwardly extending lip 16, described in my patent, which serves to secure the plate 15 to the body by receiving a screw 17.

In providing a bait to simulate a live mouse, I had little difficulty with the body, finding that the oscillating movement given by the mouth-piece of my issued patent was satisfactory in giving the plug a little oscillating or darting movement, which, although not identical with the darting movement of a mouse, is sufficient to give the mouse a life-like action in the water such as to attract the attention of fish.

I have tried many methods of attaching a tail to the plug and find that the use of several feathers will come the nearest to simulating a sinuous tail having the flexibility of that of a live mouse. This is due to several facts, one being that the feathers are very flexible and yet tend to maintain graceful lines which are very nearly straight. When in the water, a bunch of these feathers will cling together so as to form a long, tubular body, pointed at the tip very similar to a mouse's tail. This is diagrammatically indicated in Fig. 5, wherein the tail is shown in outline.

My greatest difficulty, however, was not in finding a suitable material for the tail, but in discovering a suitable method of attaching the tail to the body so as to obtain the proper action in the water. Various methods of attaching the tail to the rear end of the plug were tried without success. I have found that to attach the tail at the rear of the plug will in every instance, to a greater or lesser degree, dampen the swing of the plug so much as to almost eliminate the action entirely. In the diagrammatical view, shown in Fig. 5, I have indicated approximately at 18 the center about which the plug will oscillate while being pulled through the water. The resistance of the tail to lateral movement in the water applied at the rear end of the plug, where the amplitude of swing is greatest, is sufficient to dampen the oscillation to an undesirable degree. The plug, with the tail fastened in this manner, would pull practically straight through the water and the tail would trail behind with no semblance of lateral switching. After a large number of such attempts, it occurred to me that the semblance of lateral switching need not be produced entirely by moving the tail through the water but could be produced by moving the body relative to the tail. With this in view, I have attached the tail to the plug at a point just behind the mouth-piece. In doing so, I secure the tail 19 to the hook or hooks 20 near the eye end of the shank, thereof, in the usual manner and attach the eye 21 to an attaching element 16$^a$ by means of a small split ring or the like 22, which is inserted through the eye 21 and through the opening 23 in the tongue 16$^a$. (See Fig. 4). The element 16$^a$ is secured to the plug by means of the same screw 17, which secures the tongue 16$^a$ to the plug.

The element 16$^a$ is bent downwardly as at 25 to space it away from the plug 10 and allow free pivotal action of the ring without interference from the plug.

It will be noted that the points of attachment of the tail is a little ahead of the center of oscillation of the plug and thereby the forward end of the hook is given a lateral swinging movement. In view of the close proximity of the point of attachment, the leverage obtained by the hook against the body is not sufficient to hamper to any appreciable extent the oscillation of the plug.

The action of the device may be analyzed as follows: The tip of the tail exerts the same dampening effect as was observed when it was attached to the rear end of the body, but instead of dampening the oscillation of the plug, its effect is mainly to cause the rear end of the tail to tend to follow a straight line. The hook which has considerably more weight than the feathers of the tail, is given a lateral swinging movement, which, it will be seen, is always in an opposite direction to that of the rear end of the plug and the hook therefore tends to bow the tail in a direction opposite to the movement of the rear end of the plug. This direction is indicated by the arrow 26 in Fig. 5 and will reverse as the swing of the plug is reversed.

There will be a tendency of the hook to lag behind the action of the plug to a certain extent, due to inertia, but not enough to offset the bowing action of the tail in a direction opposite to the movement of the rear end of the plug.

It will now be seen that the movement of the tail laterally in the water, together with the movement of the body in an opposite direction, may be added together to obtain the range of movement through which the tail apparently swings as the device is pulled through the water. The effect of lateral switching of the tail, as it is produced upon the eye, is therefore much greater than the actual movement of the tail with respect to the body of the water.

It may be that other factors influence the action of the device in obtaining a natural appearance, for instance, the lagging of the hook, due to inertia, I believe tends to give the tail a more sinuous appearance, that is, to produce a double curve in the tail at many points instead of a single curve. I do find, however, that the device is successful in attaining the object sought, as compared with other methods which have been tried. Another advantage that may be mentioned in connection with this construction is that the mouth-piece tongue 16 serves the double function of securing the mouth-piece to the plug and carrying the tail. Thus it is unnecessary to provide an extra screw eye for securing the tail in place.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. A fish lure comprising a plug, shaped to represent an animal of the class described, means to impart oscillatory movement to the plug, and a device to simulate a tail when in the water, comprising a flexible feather, pivoted to the underside of the plug forwardly of the axis of oscillation of the plug.

2. A fish lure comprising a plug, shaped to represent an animal of the class described, a mouth piece including a portion positioned transversely of the longitudinal axis of the plug and extending below the plug, a lip formed integrally with the mouth piece and projecting rearwardly, a pin extending through said lip to secure the mouth piece to the plug, said pin being located forwardly of the center of oscillation of the plug, and a device to simulate a tail when in the water, comprising a flexible feather, pivoted to said pin.

Signed this 6th day of August, 1927, in the county of Woodbury and State of Iowa.

ERWIN E. WELLER.